124,901

UNITED STATES PATENT OFFICE.

JOSEPH M. LOEWENSTEIN, OF NEW ORLEANS, LOUISIANA.

IMPROVEMENT IN DEODORIZING AND FERTILIZING COMPOUNDS.

Specification forming part of Letters Patent No. 124,901, dated March 26, 1872.

I, JOSEPH M. LOEWENSTEIN, of New Orleans, in the parish of Orleans and State of Louisiana, have invented a new and useful Disinfecting Compound and Fertilizing Composition of Matter; and I do hereby declare that the following is a full and exact description.

To any quantity of dilute sulphuric acid I add caustic or carbonate of lime, until the acid is neutralized, forming sulphate of lime, to which I add a quantity of peat, charcoal, sand, carbolic acid, clay, common salt, and river sediment, in about equal parts; the object of my invention being to form such a combination of material as will, when combined with night-soil, deodorize it, and at the same time prevent the decomposition of it. Such a composition of matter should be used in a dry or dust state, so as to absorb the liquid matter. It should also be sufficiently cheap, so that it may come into general use. Night-soil during the heated term gives off a large quantity of gases, some of which are very deleterious to health. These differ from each other in their properties. Ammonia is always given off during the decomposition of animal matter. The sulphate which I employ is a good absorber of this gas, and which it retains as a sulphate when water is present. When ammonia is given off in a dry state it escapes into the atmosphere, but in the presence of charcoal it is absorbed. Peat has also this property. The humus of peat has the power of absorbing about 70 per cent. of ammonia, besides being valuable for plant food. Carbolic acid is well known as being antiseptic. Clay has valuable chemical properties; in the presence of sulphates and alkalies it forms an alum which will coagulate albuminous matters and prevent decomposition. But clay possesses other valuable properties. Professor Way, of England, has shown that it will absorb and retain the alkalies, potash, soda, and ammonia salts of the alkalies, exceeding in this respect the power of charcoal. It is therefore invaluable for my purpose, independent of its power to absorb the liquid night-soil and water. Sand, in combination with clay, has a mechanical value of great importance for my purpose.

Pure clay has a great tendency to become compact when combined with a small portion of water, but when compounded with sand will allow the free motion of water or vapor to pass off into the atmosphere, while the clay proper will retain the matter. Sand in clay, for my purpose, has therefore great value within certain limits. As river sediment generally contains valuable organic matter, I use a portion of it in combination, which is valuable as a manure.

I am aware that Messrs. Smith and McDougal secured a patent in England in 1854, No. 142, for a compound consisting of carbolic acid, or its equivalent, combined with caustic soda, or potash, and a saponifiable substance, chemically combined and in such proportions as to form a soluble paste or salve, to be used for destroying vermin in sheep. I do not claim such a combination. I am also aware that one Alex. McDougal obtained an English patent in 1860, and numbered 2,510, for disinfecting purposes, in which he claims the use of carbolic acid, either alone or in combination, forming carbolates, used either alone or in combination with sulphuric acid or sulphites, all or either used in an acid or alkaline state. He also uses sometimes a mixture of sulphite of magnesia and lime, or a mixture of both, and carbolate of magnesia and lime. I do not claim this combination. I am also aware that William Somes, of Washington, D. C., was granted a United States patent, July 16, 1867, for a combination of carbolic acid and sulphuric acid for preserving meats; but I do not claim that combination.

What I claim, and desire to secure by Letters Patent, is—

The combination consisting of sulphate of lime, peat, charcoal, carbolic acid, sand, clay, common salt, and river sediment, in about the proportion given, when prepared and used in the manner and for the purpose as set forth and described.

J. M. LOEWENSTEIN.

Witnesses:
   V. D. TERREBONNE, Jr.,
   F. M. AROHMANN.